(12) United States Patent
Brien

(10) Patent No.: US 8,765,841 B2
(45) Date of Patent: Jul. 1, 2014

(54) LOW CARBON FOOTPRINT COATING MATERIAL FOR CONSTRUCTION PRODUCTS

(71) Applicant: Joshua V. Brien, Lexington, KY (US)

(72) Inventor: Joshua V. Brien, Lexington, KY (US)

(*) Notice: Subject to any disclaimer, the term of this patent is extended or adjusted under 35 U.S.C. 154(b) by 0 days.

(21) Appl. No.: 13/726,850

(22) Filed: Dec. 26, 2012

(65) Prior Publication Data

US 2013/0172449 A1    Jul. 4, 2013

Related U.S. Application Data

(60) Provisional application No. 61/581,759, filed on Dec. 30, 2011.

(51) Int. Cl.
C08K 3/34 (2006.01)

(52) U.S. Cl.
USPC ........................................................ 523/218

(58) Field of Classification Search
USPC .......................................... 523/218; 524/2–8
See application file for complete search history.

(56) References Cited

PUBLICATIONS

Albino, V., Cloffi, R., Marroccoli, M., Santoro, L., 1996, Potential Application of Ettringite Generating Systems for Hazardous Waste Stabilization, Journal of Hazardous Materials, vol. 51, Issues 1-3, Nov. 1996, pp. 241-252.
Bensted, J., 1998, Lea's Chemistry of Cement and Concrete, 4th Edition, ISBN 0-340-56589-6.
Blackley, D.C., 1997, Polymer Latices vol. 2 and vol. 3, ISBN: 0412-62880-5 and ISBN 0412-62890-2.
Boxley, C., Nickens, A., Guo, Q., 2009, Beneficiation and Utilization of Fly Ash Containing Mercury Impregnated Activated Carbon, 2009 World of Coal Ash, Ceramtec Inc, http://www.flyash.info.
Chandra, S., Berntsson, L., 2002, Lightweight Aggregate Concrete, Noyes Publications, ISBN 0-8155-1486-7.
Copper, C., Hanna, S., Bhattacharyya, T., Declerck, A., Jones, R., Kincheloe, C., Shull, B., 2011, EPA Promoted the Use of Coal Ash Products With Incomplete Risk Information, Evaluation Report, Report No. 11-P-0173, Mar. 23, 2011, EPA http://www.epa.gov/oig/reports/2011/20110323-11-P-0173.pdf.
Coumes, C.C.D., Courtois, S., Peysson, S., Ambroise, J., Pera, J., 2009, Calcium sulfoaluminate cement blended with OPC: A potential binder to encapsulate low level radioactive slurries of complex chemistry, Cement and Concrete Research 39 (2009) 740-747.
Gastaldi, D., Fulvio, C., Boccaleri, E.,2009, Ettringite and calcium sulfoaluminate cement: investigation of water content by near-infrared spectroscopy, Journal of Material Science, 44: 5788-5794, 2009.
Kosson, D., 1999, Proceedings of the Environmental Protection Agency, Public Meeting on Waste Leaching, Session III Leaching Science, http://www.epa.gov/osw/hazard/testmethods/pdfs/overvwepa.pdf.
Kulaots, I., Hurt, R., Suuberg, E., 2002, Size Distribution of Unburned Carbon in Coal Fly Ash and its Role in Foam Index, Division of Engineering, Brown University.
LaCount, R., Baltrus, J., Banfield, T., Diehl, J., Giles, K., Kern, D., Leyda, T., Pique, P., 2003, Treatments for Lowering Foam Index in High Carbon Fly Ashes for Concrete Applications, Department of Chemistry, Waynesburg College, Waynesburg PA.
Maroto-Valer, M., Taulbee, D., Schobert, H., Hower, J., 2009, Characterization of Differing Forms of Unburned Carbon Present in Fly Ash, University of Kentucky Center for Applied Energy Research, 2009 WOCA Conference www.flyash.info.
Massazza, F., 1998, Lea's Chemistry of Cement and Concrete, 4th Edition, ISBN 0-340-56589-6.
Moghaddam, A., Najafpour, G., Mohammadi, M., Heydarzadeh, H., 2009, Removal of Methylene Blue from Waste Stream by Fly Ash-clay-sand Adsorbent, World Applied Sciences Journal 6(8): 1073-1077, 2009.
NEN 7371, 2005, Leaching Characteristics of Granular Building and Waste Materials, The Determination of the Availability of Inorganic Components for Leaching, 'The Maximum Availability Leaching Test', based on a translation of the Netherlands Normalisation Institute Standard, Version 1, 2005.
NEN 7375, 2005, Leaching Charateristics of Molded or Monolithic Building and Waste Materials, Determination of Leaching of Inorganic Components with the Diffusion Test, 'The Tank Test', based on translation of the Netherlands Normalisation Institute Standard, Version 1, 2005.
Ohama, Y., 1995, Handbook of Polymer-Modified Concrete and Mortars, Noyes Publications, ISBN 0-8155-1358-8.
Schrivner, K.L., Capmas, A., 1998, Lea's Chemistry of Cement and Concrete, 4th Edition, ISBN 0-340-56589-6.
Stevens, W., Robl, T., Mahboub, K., 2009, The Cementitious and Pozzolanic Properties of Fluidized Bed Combustion Fly Ash, University of Kentucky Center for Applied Energy Research, 2009 WOCA Conference.
Taylor H.F.W., 1997, Cement Chemistry 2nd Edition, ISBN 0-7277-2592-0.
Malviya, R., Chaudhary P., "Evaluation of Leaching Characteristics and Environmental Compatibility of Solidified/Stabilized Industrial Waste"; J Mater Cycles Waste Manag (2006) 8:78-87.
Esser, P.M., van der Sloot, H.A., Suitela, W., "Harmonization of Leaching Tests: Leaching Behaviour of Wood"; Heron, vol. 46, No. 4, (2001) 239-252.
Pereira, C.F., Luna, Y., Querol, X, Antenucci, D., Vale, J., "Waste Stabilization/Solidification of an Electric Arc Furnace Dust Using Fly Ash-Based Geopolymers"; ScienceDirect, Fuel 88 (2009) 1185-1193.

(Continued)

Primary Examiner — Peter Szekely
(74) Attorney, Agent, or Firm — Middleton Reutlinger

(57) ABSTRACT

Disclosed is a composition, useful for a coating material, comprising coal ash and latex polymer and optionally a hydraulic binder, a superplasticizer, a rheology modifier, a filler, an aggregate, a foaming agent, a de-foaming agent, an accelerant and/or a retardant. The composition possesses favorable physicochemical properties and a low carbon footprint.

12 Claims, No Drawings

(56) References Cited

OTHER PUBLICATIONS

Jewell, R et al., "Fabrication and Testing of CSAB Cements in Mortar and Concrete that Utilize Circulating Fluidized Bed Combustion By-Products"; 2009 World of Coal Ash (WOCA) Conference, May 4-7, 2009, Lexington, KY, USA.

Ward, C. et al, "Testing of Interactions between Coal Ash Leachates and Rock Materials for Mine Backfill Evaluations"; Coal Combustion and Gasifications Products Journal, 2010.

Arroyo, F. et al, "Precipitation of Germanium from Coal Fly Ash Leachates"; Coal Combustion and Gasification Products Journal, 2010.

LOW CARBON FOOTPRINT COATING MATERIAL FOR CONSTRUCTION PRODUCTS

CROSS-REFERENCE TO RELATED APPLICATIONS

Priority is claimed on the basis of U.S. Provisional Application No. 61/581,759, filed 30 Dec. 2011, the entire contents of which are hereby incorporated by reference.

FIELD OF THE INVENTION

The invention relates to a dry mix product useful in making a coating material suitable for sustainable building, the product comprising dispersible polymer powder and coal ash, and optionally a hydraulic binding agent(s), one or more filler materials and/or one or more other additives commonly used with cementitious systems.

BACKGROUND OF THE INVENTION

Traditional coating materials comprising latex polymer and coal ash are generally "two component" systems with the polymer in the form of a liquid dispersion (emulsion) and the coal ash as a powdered solid. Traditional "two component" coating material systems involving a liquid latex polymer and other solid material(s) require additional steps for preparation on a job site when compared with one component, dry mix systems. Two component systems typically require additional weighing or metering processes for "slurry" preparation when compared with one component, dry mix systems. Each additional weighing or metering step associated with two or more component coating systems introduces additional possibilities for error with each additional weighing or metering device when compared with pre-manufactured or pre-blended one component, dry mix systems. In addition to increased probability of error associated with field application of two or more component coating systems, latex polymers in liquid form are often susceptible to freeze damage. Typical behavior is that the polymeric dispersion will experience a morphology change upon freezing and thawing rendering the material no longer usable for coating applications. One component, dry mix systems are not susceptible to freeze damage and can be left on a job site in temperatures below the freezing point of water without being damaged. These two attributes provide motivation to replace traditional "two component" systems with one component, "dry mix" systems in the construction industry.

As a result of stricter guidelines for gaseous emissions, traditional coal fired power plants are either modifying their processes or adopting new technologies. Such process modification often influences properties of coal ash waste streams, making future production of fly ash with significantly higher carbon contents seem imminent. In addition to production of higher carbon content coal ash, these newly implemented technologies may also yield coal ashes which are not high in carbon content in terms of loss on ignition (LOI), yet these coal ashes will differ significantly from what has been regarded as the customary coal ash as lower process temperatures cause a morphology change from fused, spherical particles to platy type particles which are not completely fused. Nevertheless, whether a coal ash is high in carbon or not completely fused, such a coal ash is deemed "problematic" with respect to beneficial use within the cementitious materials industry.

In past regulatory environments, markets existed for fly ashes containing high contents of carbon—for example, coal ashes with loss on ignition (LOI) greater than three percent. During these times, one routine outlet for high carbon content fly ash was its use as feedstock to cement kilns. Various fly ashes may be high in silica and alumina containing compounds making these materials valuable contributors to cement production from a technologic point of view. Although fly ash may accordingly serve as a useful raw material for cement production, new industrial emissions standards may endanger such a promising outlet for fly ash. This is because fly ashes may also contain nuisance materials such as, for example, arsenic, mercury, lead, cadmium and zinc. When introduced to the high operating temperatures of a cement kiln, these materials have a tendency to transition into their respective vapor phases, thus becoming gaseous emissions. New emissions standards may force cement producers to seek raw materials that will not be significant contributors to unwanted gaseous pollutants. For this reason, fly ashes once used in cement kilns may be expected to end up in landfills. It is now becoming apparent that new regulatory regimes create new challenges for both the coal fired utilities industry and the cement industry. New regulations may clean up the air, but these regulations are continuing to pressure the industry with regard to finding outlets for waste streams.

SUMMARY OF THE INVENTION

The invention provides a dry mix product incorporating a significant content of what would otherwise be regarded as waste material into a coating material having performance suitable for use in construction. According to the invention a dry mix product provides a pre-packaged or pre-blended material treated on a job site as "one component" with which a medium is admixed, typically an aqueous medium, to form a coating material. The coating material so formed may be applied to a substrate material by whatever means necessary whether it be troweling, brushing, spraying, gunnite, rolling, pumping, knife, etc. The invention accordingly provides an outlet for problematic coal ash resulting from modifications to coal burning processes to meet stricter mandated emissions standards. Typically, problematic coal ash falls outside specifications provided by ASTM C618, Standard Specification for Coal Fly Ash and Raw or Calcined Natural Pozzolan for Use in Concrete. The invention provides a beneficial product formed at least in part from what would otherwise be regarded as waste materials, obviating the need for landfilling of such materials. A product according to the invention may comprise coal ash from fluidized bed combustion (FBC) processes. A product according to the invention may comprise one or more coal ashes containing large amounts of activated carbon. A product according to the invention may comprise high carbon content coal ash. Such problematic coal ashes as may be comprised in a product according to the invention are typically not used in cementitious materials due to their inherent nature of either absorbing or adsorbing air entraining admixtures (AEA) resulting in inconsistent air contents. A product according to the invention is useful in making coating materials for traditional construction products. A product according to the invention is useful in making tough, flexible coating materials with a wide range of physical properties enabled by 1 to 1 substitution of dispersible polymer powder. The viscosity range of dispersible polymer powders within certain polymer families is vast and is especially noticeable when mixed with water in a mixture such that the consistency is one part dispersible polymer powder and 1 part water. The viscosity range resulting from 1 to 1 substitution of dispersible polymer powder in a specified coating mix design or recipe can allow the end user to choose from a range of performance parameters as a result of either polymer physical properties or physical properties resulting from interactions of polymer, waste material and possibly hydraulic binding agent, such as a cementitious material. Construction products can accordingly be manufactured based upon local waste materials and global specialty products including but not limited to dispersible polymer powder, specialty admixtures and possibly hydraulic binder(s).

A product according to the invention is useful in making any of a plurality of coating materials with a wide range of mechanical properties dependent upon formulation constituent amounts. One skilled in the art of copolymers of vinyl acetate/ethylene, vinyl acetate/vinyl chloride, vinyl acetate/vinyl laurate or terpolymers of vinyl acetate/ethylene/veova, vinyl acetate/ethylene/vinyl chloride, or vinyl acetate/ethylene/vinyl laurate or a related polymer chemistry can discern a wide range of performance when these polymers are substituted 1:1 in specific product mix designs. For example, polymers exhibiting thixotropic behavior may impart anti-sag properties for a coating mix design. Polymers exhibiting flowing or plasticizing behavior may impart a thinning or viscosity reducing effect for a coating mix design. This range of mechanical properties enables any of the plurality of coating materials to be regarded as an environmentally favorable substitute for a traditional coating material incorporating a substantial percentage of virgin material as mix design component(s). For example, such materials may be seen as viable substitutes for traditional cementitious coatings in specific applications. An embodiment of a product according to the invention can be mixed with a liquid medium to form a coating material, and such a coating material may serve as a substitute for a traditional two component coating material typically consisting of hydraulic agent and a polymeric dispersion. A coating material made from a dry mix according to the invention can be used as an alternative to asphalt binders for use in subterranean wall coating applications. A coating material made from a dry mix according to the invention is useful as a protective coating for one or a plurality of metal surfaces, with examples not being limited to structural steel and automotive metal. A coating material made from a dry mix according to the invention is useful as a crack isolation membrane in a paving or other construction application. A coating material made from a dry mix according to the invention is useful as a substitute for one or a plurality of traditional coatings for wooden surfaces. A coating material made from a dry mix according to the invention is useful as a substitute for one or a plurality of traditional coatings for concrete surfaces. A coating material made from a dry mix according to the invention is useful in mitigating spall common to failure of otherwise brittle materials.

DETAILED DESCRIPTION OF THE PREFERRED EMBODIMENTS

The invention now will be described more fully hereinafter. The invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The invention provides a "dry mix" product suitable for admixing with water or other suitable liquid medium for preparation of a slurry or other heterogeneous mixture for application as a coating material to a substrate material. The coating material may be applied to the substrate material through use of a brush, trowel, knife, roller, spraying device, spackling device, dipping device, gunnite device or any other suitable means, whether it be mechanical, manual or divine, for coating application. Water demand of such a coating material may appear to be high when compared with traditional cementitious coatings. Successful test specimens were produced utilizing a wide range of water demands which may be correlated to three important mix design ratios—polymer/waste material, polymer/total solids and water/binder. A wide range of viscosities may accordingly be achieved. An achieved viscosity may be determined by inter alia the amount and chemical composition of dispersible polymer powder. Water demand of a coating material made from a product according to the invention will depend upon inter alia polymer/waste material, polymer/total solids and water/binder ratios and application method and accordingly be suitable for meeting end-user specifications.

Successful application of the invented coating materials is dependent upon adequate degrees of polymer film formation. During film formation, polymer lattices undergo an irreversible change from a stable colloidal dispersion to a continuous, transparent and mechanically stable film. The process of film formation may be divided into three stages. Stage I is evaporation, in which the dispersion increases in density until the particles touch. The particles then undergo deformation to polyhedra in stage II. In stage III, the boundaries between the particles disappear through the interdiffusion of polymer chains, and the film develops its final strength. Given the necessity of adequate polymer film formation, substrate characteristics, not being limited to porosity, often dictate material formulation requirements for the invented coating materials. For example, when applying the invented materials over porous asphalt substrates, proper care must be taken to retain enough liquid medium in the newly applied coating material to ensure sufficient conversion during stage III of the film formation process such that the boundaries between polymer particles disappear and the resultant polymer film forms with sufficient strength. One possibility for assuring such acceptable film formation ultimately leading to desired coating performance over porous asphalt substrates is potentially achievable through addition of rapidly setting hydraulic binder(s) in conjunction with viscosity modifiers (such as HEMC) during product formulation as inclusion of such materials ensures sufficient medium is hurriedly utilized for polymer film formation as opposed to being transferred to the porous substrate through traditional heat and mass transfer driving forces and associated concentration gradients.

In an embodiment, a product according to the invention may comprise vinyl acetate/ethylene dispersible polymer powder, or any suitable latex polymer powder, and either a sole waste material or a combination of waste materials. In an embodiment, a product according to the invention may consist essentially of vinyl acetate/ethylene dispersible polymer powder, or any suitable latex polymer powder, and either a sole waste material or a combination of waste materials. In an embodiment, a product according to the invention may consist of vinyl acetate/ethylene dispersible polymer powder, or any suitable latex polymer powder, and either a sole waste material or a combination of waste materials. Latex polymer powders include elastomeric latexes, thermoplastic latexes and thermosetting latexes or any combination thereof. Waste materials refer to coal combustion by-products, slag, granulated blast furnace slag, ground granulated blast furnace slag, silica fume, etc. Coal combustion by-products include but are not limited to class C fly ash, class F fly ash, non-classified coal ash, bottom ash, cinders and materials from fluidized bed operations.

In an embodiment, a product according to the invention may comprise vinyl acetate/ethylene dispersible polymer powder, or any suitable latex polymer powder, a coal combustion by-product and a hydraulic binder, preferably a cementitious-type hydraulic binder. In an embodiment, a product according to the invention may consist essentially of vinyl acetate/ethylene dispersible polymer powder, or any suitable latex polymer powder, a coal combustion by-product and a hydraulic binder, preferably a cementitious-type hydraulic binder. In an embodiment, a product according to the invention may consist of vinyl acetate/ethylene dispersible polymer powder, or any suitable latex polymer powder, a coal combustion by-product and a hydraulic binder, preferably a cementitious-type hydraulic binder.

In an embodiment, a product according to the invention may comprise vinyl acetate/ethylene dispersible polymer powder, or any suitable latex polymer powder, a coal combustion by-product, a hydraulic cementitious binder and a viscosity modifier for cementitious systems. In an embodiment, a product according to the invention may consist essentially of vinyl acetate/ethylene dispersible polymer powder, or any suitable latex polymer powder, a coal combustion by-product, a hydraulic cementitious binder and a viscosity modifier for cementitious systems. In an embodiment, a product according to the invention may consist of vinyl acetate/ethylene dispersible polymer powder, or any suitable latex polymer powder, a coal combustion by-product, a hydraulic cementitious binder and a viscosity modifier for cementitious systems.

In an embodiment, a product according to the invention may comprise vinyl acetate/ethylene dispersible polymer powder, or any suitable latex polymer powder, a coal combustion by-product, a hydraulic cementitious binder, a viscosity modifier for cementitious systems and a water reducing agent or a plasticizing agent for cementitious systems. In an embodiment, a product according to the invention may consist essentially of vinyl acetate/ethylene dispersible polymer powder, or any suitable latex polymer powder, a coal combustion by-product, a hydraulic cementitious binder, a viscosity modifier for cementitious systems and a water reducing agent or a plasticizing agent for cementitious systems. In an embodiment, a product according to the invention may consist of vinyl acetate/ethylene dispersible polymer powder, or any suitable latex polymer powder, a coal combustion by-product, a hydraulic cementitious binder, a viscosity modifier for cementitious systems and a water reducing agent or a plasticizing agent for cementitious systems.

In an embodiment, a product according to the invention may comprise vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and a filling material for cementitious systems. In an embodiment, a product according to the invention may consist essentially of vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and a filling material for cementitious systems. In an embodiment, a product according to the invention may consist of vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and a filling material for cementitious systems.

In an embodiment, a product according to the invention may comprise vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and an aggregate material for cementitious systems. In an embodiment, a product according to the invention may consist essentially of vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and an aggregate material for cementitious systems. In an embodiment, a product according to the invention may consist of vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and an aggregate material for cementitious systems.

In an embodiment, a product according to the invention may comprise vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and a filling material for cementitious systems, and may additionally comprise a gelling or cross linking agent such as a borate, for example, sodium borate, or a cross linking agent such as but not limited to maleic anhydride. In an embodiment, a product according to the invention may consist essentially of vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and a filling material for cementitious systems, and may additionally comprise a gelling or cross linking agent such as a borate, for example, sodium borate, or a cross linking agent such as but not limited to maleic anhydride. In an embodiment, a product according to the invention may consist of vinyl acetate/ethylene dispersible polymer powder, or any suitable latex polymer powder, a coal combustion by-product, a hydraulic cementitious binder, a viscosity modifier for cementitious systems, a water reducing agent or a plasticizing agent for cementitious systems, and a filling material for cementitious systems, and may additionally comprise a gelling or cross linking agent such as a borate, for example, sodium borate, or a cross linking agent such as but not limited to maleic anhydride.

Experimental results obtained illustrated that a wide variety of combinations of aforementioned materials are suitable for use in preparing coating materials so long as dispersible polymer powder (or any suitable latex polymer powder), waste materials, including but not limited to coal combustion by-products, and optionally hydraulic binders were primary constituents.

The following examples are meant to illustrate the invention.

A coating material according to the invention may consist inter alia of 79.05% VAE DPP and 20.95% Class C Fly Ash. A coating material according to the invention may consist inter alia of 66.45% VAE DPP and 33.55% Class C Fly Ash.

Without wishing to be bound by theory, the applicant conceived of a product comprising dispersible polymer powder (or any suitable latex polymer powder), waste materials, including but not limited to coal combustion by-products, and optionally hydraulic binders, the product useful for preparing a coating material. The applicant reduced to practice this product in order to provide a functional alternative to landfilling problematic coal ash.

The invention provides inter alia a product containing thirty percent or greater amounts of coal ash with properties outside specifications provided by ASTM C618, Standard Specification for Coal Ash and Raw or Calcined Natural Pozzolan for Use in Concrete. A product according to the invention accommodates contemporary principles of "fluid design" in keeping with contemporary best engineering practices.

Examples of a coating prepared from a product according to the invention having been in experimental use include a waterproofing coating for concrete block cellar walls, a repair system coating for deteriorating clay brick chimneys, an asphalt pavement repair system coating, a high tensile strength underlayment coating for leveling a concrete floor, and a flexible cementitious coating for plywood.

The applicant prepared prototype coating specimens using dispersible polymer powder and coal ash. The applicant recognized that two coal ashes in particular met "problematic" criteria. One coal ash source was a fluidized bed combustion (FBC) process. Another coal ash containing greater than two percent activated carbon was sourced from a traditional pulverized coal combustion (PCC) process.

The applicant then developed thirteen coating embodiments based upon coal ash and eight coating embodiments based upon hydraulic cement binder for long term comparison. Embodiments were stored at ambient indoor conditions for four hundred to five hundred days. Select embodiments were subject to sporadic water immersion testing. Satisfactory prototype materials ranged in composition from 30% coal ash with 70% polymer to 70% coal ash with 30% polymer.

Coating properties varied with changes in both coal ash and polymer concentrations. Coating properties also changed as a result of coating thickness. Coating mix designs containing higher percentages of coal ash possessed rigid characteristics; whereas, coating mix designs containing higher percentages of polymer demonstrated elastic properties. Coatings became more rigid with increases in application thickness.

Surprisingly, it was found that the flexibility of coal ash embodiments remarkably varied from that of hydraulic cement prototypes. The latter stiffened with age; whereas embodiments comprising coal ash maintained flexibility. An overhanging sample of a flexible coating consisting of 67% dispersible polymer powder and 33% FBC coal ash maintained gross structural integrity but was subject to a high degree of gravitational deformation. An overhanging sample of a flexible coating consisting of 33% dispersible polymer powder and 67% FBC coal ash maintained gross structural integrity and was subject to a much lesser degree of gravitational deformation.

The microstructure of coating material prototypes containing only coal ash and dispersible polymer powder is of considerable interest. Without wishing to be bound by theory, applicant, upon examining scanning electron microscopy (SEM) data for prototype samples containing only coal ash and dispersible polymer powder, inferred that the polymer film presented a suitable medium for occurrence of hydration type reactions.

SEM of a sample containing 67% coal ash and 33% polymer, with the coal ash being Joppa Class C, showed hexagonal crystal growth at the coating surface, believed by applicant to be ettringite crystals propagating from coal ash particles within the polymer film.

Such a network of ettringite crystals can serve as a means of reinforcement for polymer film, thus creating a very tough, flexible coating material. SEM showed that numerous crystal fractures likely resulted from knife cutting action during sample preparation. Although fractured, structures believed by the applicant to be ettringite crystals remained randomly distributed, likely continuing to provide support throughout the tough, flexible polymer film suggesting the material may be of value for applications requiring impact resistance. SEM showed numerous instances for observation of severed hexagonal shaped crystals.

The breadth of the invention will be additionally seen in the following illustrative and non-limiting further examples.

Further Example 1

A composite product comprising a substrate layer and one or more functional layers applied thereto, each functional layer including a mixture of latex polymer powder, preferably VAE or related technology, waste materials, preferably of pozzolanic nature which via combination allow for heat and mass transfer processes to occur resulting in a setting or hardening of the material.

Further Example 1a

The dispersible polymer powder is included in coating mix designs in a range from 30 to 90%. Preferred dispersible polymer powder mix design amounts are in a range from 40 to 80%. Most preferred dispersible polymer powder mix design amounts are in a range from 50 to 70%.

Further Example 2

A composite product according to Further example 1, wherein the pozzolanic material may be coal ash, slag, blast furnace slag, ground granulated blast furnace slag, volcanic ash, metakaolin, silica fume or any other suitable material demonstrating pozzolanic characteristics Further Example 2a The pozzolanic materials, or waste materials will be included in coating mix designs in a range from 20 to 90%. Preferred waste material mix design amounts range from 40 to 80%. Most preferred waste material mix design amounts range from 50 to 60% by mass of the total dry mix.

Further Example 3

A composite product according to Further example 1, wherein the pozzolanic material may be high carbon content coal ash or otherwise problematic coal ash possibly resulting from process technologies adopted by coal fired operations necessary to meet stricter emissions standards.

Further Example 4

A composite product according to Further example 1, wherein the polymer properties compensate for detrimental effects previously known to accompany addition of problematic coal ash, or waste materials possessing undesirable characteristics, when incorporated with mix designs for cementitious materials.

Further Example 5

A composite product according to Further example 1, wherein hydraulic binders may be added to achieve desired material properties, where the hydraulic binders are not limited to ordinary portland cement, calcium aluminate cement, calcium sulfoaluminate cement, acid/base cements, activated slag cements and alkali activated cements. Furthermore, according to the invention, the term "hydraulic binder" refers to a pulverized material in the solid, dry state, which when mixed with water yields mixtures which are able to set and harden, with a common example being the term "cement". A hydraulic binder may comprise one or more individual component materials. A hydraulic binder may undergo setting and hardening when exposed to suitable medium. Utilizing cement chemistry nomenclature where $C=CaO$, $\acute{S}=SO_3$, $S=SiO_2$, $A=Al_2O_3$, $H=H_2O$, $F=Fe_2O_3$, $N$=sodium based materials, $K$=potassium based materials, any of such hydraulic binder materials may hydrate to form materials containing $C$-$A$-$\acute{S}$-$H$ type phases and $(N,K)$-$A$-$\acute{S}$-$H$ type phases in addition to more traditional type phases common to ordinary portland cement hydration. Examples of such individual component materials should not be limited to all forms of calcium sulfate, hydrated lime, quicklime, alumina, alumina tri-hydrate, alite, belite, tri-calcium aluminate, yeelimite (kleins compound), calcium aluminate, $C_{12}A_7$, coal ash, slag, silica fume, pozzolana, clay, bauxite, red mud, brownmillerite or any other suitable material or combination of materials which when exposed to water or other suitable medium is able to set and harden. The term "cement" includes hydraulic and alite cements such as portland cement, blended cement, slag cement, pozzolanic cement, calcium aluminate cement, calcium sulfoaluminate cement or any other common cementing material or combination thereof.

Further Example 5a

The hydraulic binder component amount required for this aspect of the invention is in the range of 0 to 30%, preferably 0 to 15% and most preferably 0 to 5% based upon total dry mass of the specific mix design.

Further Example 6

A composite product according to Further example 1, wherein additives or fillers are incorporated into the functional layer(s) to provide specified material properties, with examples being not limited to, set accelerators, set retarders, rheology modifiers, plasticizing agents, thickening agents, flow agents, foaming agents, defoaming agents, density modifiers, dyes, color enhancers, thermal resistance providers, materials aiding impact resistance, materials aiding optical reflectance, radar reflecting materials, electron conducting or otherwise conductive materials or corrosion inhibiting materials.

Further Example 6a

These common viscosity modifiers and system stabilizers can be used in coating mix designs in a range from 0 to 20%, preferably 0 to 2% and most preferably 0 to 1% by mass of the dry mix.

Further Example 6b

Typically, plasticizers are incorporated less than 5% by total dry mix mass.

Further Example 6c

Typically, such set retarders are used in mix designs in quantities less than 5% by total mass of dry mix.

Further Example 6d

Typically, such set accelerators are used in mix designs in quantities less than 5% by total mass of dry mix.

Further Example 6e

Typical surfactant addition rates are normally less than 5%. However, specific specialty mix designs may require greater amounts.

Further Example 6f

For some mix designs, de-foaming material requirements have exceeded 20% by mass of the total dry mix. For the purposes of this embodiment, de-foaming material amounts may range from 0 to 30%, preferably 1 to 20% and most preferably 1 to 5% by mass of the dry mix.

Further Example 6g

These common filling materials can be used in coating mix designs in a range from 0 to 40%, preferably 0 to 30% and most preferably 0 to 20% by mass of the dry mix.

Further Example 7

A composite product according to Further example 1, wherein reinforcing materials are added, with the reinforcing materials not limited to fibers, reinforcing mesh, wire mesh, fiberglass mesh, Kevlar mesh, carbon fibers, carbon fiber mesh, rebar, epoxy coated rebar, pre-stressing tendons, post stressing tendons, molded plastic or other suitable means of reinforcement are necessary for achieving desired material properties. Examples of fiber type materials should not be limited to metal fibers, organic fibers or a mixture of metal and organic fibers. Examples of organic fibers should not be limited to polyvinyl alcohol fibers (PVA), polyacrylonitrile fibers (PAN), polyethylene fibers (PE), high density polyethylene fibers (HDPE), polypropylene fibers (PP) or homo or co-polymers of polyamide or polyimide. Mixtures of any type of fibers may also be used, especially mixtures of fibers with different physical dimensions. Addition of fibrous material to cementitious type mixtures may be facilitated by use of a viscosity modifying agent which ensures proper dispersal of fibers throughout the mixture, with an example being Kelco-Crete which is an anionic polysaccharide from CP Kelco. Furthermore, aramid type fibers, such as fibers with AABB configuration, with examples not being limited to Kevlar, Twaron, Nomex, New Star and Teijinconex, may be included in a multitude of possible arrays. Additionally, novel materials such as combinations of boron oxides and polyethylene may be utilized as means of reinforcement. Mesh type materials may also be used as a means of reinforcement. Examples of mesh type materials should not be limited to fiberglass mesh, polyethylene mesh or Kevlar mesh.

Further Example 8

A composite product according to Further example 1, wherein aggregate may be added to achieve desired material characteristics, whether they be for mechanical or aesthetic purposes

Further Example 8a

These common aggregate materials can be used in coating mix designs in a range from 0 to 40%, preferably 0 to 30% and most preferably 0 to 20% by mass of the dry mix.

Further Example 9

A composite product according to Further example 1, wherein a specialty chemical is added, thereby introducing cross-linking behavior for the polymeric material, with examples including but being not limited to sodium borate and/or maleic anhydride.

Further Example 10

A composite product according to Further example 1, wherein a dessicating material, such as lime or quicklime among other possibilities may be incorporated so as to achieve proper hydration or setting or drying characteristics depending upon application method.

Further Example 11

A composite product according to Further example 1, wherein a fungicide or biocide may be added.

Further Example 12

A composite product according to Further example 1, wherein a fugitive plasticizer may be added.

Further Example 13

A composite product according to Further example 1, wherein one or more flame retarding materials may be added.

Further Example 14

A composite product according to Further example 1, wherein one or more anti-oxidizing agents may be added.

Further Example 15

A composite product according to Further example 1, wherein one or more corrosion resistant or anti-corrosion materials may be added.

Further Example 16

A composite product according to Further example 1, wherein a light reflecting material or ultra violet (UV) light or radiation protecting material may be added.

Further Example 17

A composite product according to Further example 1, wherein one or more pigments or dyes may be added.

Further Example 18

A composite product according to Further example 1, wherein the product may be applied according to any suitable application method, with examples being shotcrete, gunnite, trowel, knife, roll, brush or spray.

The invention accordingly provides inter alia the following Exemplary examples:

Exemplary Example 1

A composition, useful for a coating material, comprising: (a) no more than 75%, by weight, coal ash, wherein the loss on ignition of the coal ash is greater than 3%; (b) at least 25%, by weight, latex polymer; and optionally (c) a hydraulic binder, a superplasticizer, a rheology modifier, a filler, an aggregate, a foaming agent, a de-foaming agent, a reinforcing agent, an accelerant and/or a retardant.

Exemplary Example 2

A composition, useful for a coating material, consisting of: (a) no more than 75%, by weight, coal ash, wherein the loss on ignition of the coal ash is greater than 3%; and (b) at least 25%, by weight, latex polymer.

Exemplary Example 3

A coating material produced by admixing (a) no more than 75%, by weight, coal ash, wherein the loss on ignition of the coal ash is greater than 3%; (b) at least 25%, by weight, latex polymer; and optionally (c) a hydraulic binder, a superplasticizer, a rheology modifier, a filler, an aggregate, a foaming agent, a de-foaming agent, a reinforcing agent, an accelerant and/or a retardant.

Exemplary Example 4

An article, comprising a surface and a coating, the article manufactured by contacting, with a surface in need of coating, a coating comprising (a) no more than 75%, by weight, coal ash, wherein the loss on ignition of the coal ash is greater than 3%; and (b) at least 25%, by weight, latex polymer.

Exemplary Example 5

A consumable article, comprising a suitable container-closure system and a coating material, wherein the coating material is contained within the suitable container-closure system, and wherein the coating material is produced by admixing (a) no more than 75%, by weight, coal ash, wherein the loss on ignition of the coal ash is greater than 3%; and (b) at least 25%, by weight, latex polymer; and optionally (c) a hydraulic binder, a superplasticizer, a rheology modifier, a filler, an aggregate, a foaming agent, a de-foaming agent, a reinforcing agent, an accelerant and/or a retardant.

Exemplary Example 6

A composition according to Exemplary example 1, wherein the loss on ignition of the coal ash is greater than about 4%.

Exemplary Example 7

A composition according to Exemplary example 2, wherein the loss on ignition of the coal ash is greater than about 4%.

Exemplary Example 8

A coating material according to Exemplary example 3, wherein the loss on ignition of the coal ash is greater than about 4%.

Exemplary Example 9

An article according to Exemplary example 4, wherein the loss on ignition of the coal ash is greater than about 4%.

Exemplary Example 10

A consumable article according to Exemplary example 5, wherein the loss on ignition of the coal ash is greater than about 4%.

Exemplary Example 11

A composition according to Exemplary example 1, wherein the loss on ignition of the coal ash is greater than about 5%.

Exemplary Example 12

A composition according to Exemplary example 2, wherein the loss on ignition of the coal ash is greater than about 5%.

Exemplary Example 13

A coating material according to Exemplary example 3, wherein the loss on ignition of the coal ash is greater than about 5%.

Exemplary Example 14

An article according to Exemplary example 4, wherein the loss on ignition of the coal ash is greater than about 5%.

Exemplary Example 15

A consumable article according to Exemplary example 5, wherein the loss on ignition of the coal ash is greater than about 5%.

Exemplary Example 16

A composition according to Exemplary example 1, wherein the loss on ignition of the coal ash is greater than about 8%.

Exemplary Example 17

A composition according to Exemplary example 2, wherein the loss on ignition of the coal ash is greater than about 8%.

Exemplary Example 18

A coating material according to Exemplary example 3, wherein the loss on ignition of the coal ash is greater than about 8%.

Exemplary Example 19

An article according to Exemplary example 4, wherein the loss on ignition of the coal ash is greater than about 8%.

Exemplary Example 20

A consumable article according to Exemplary example 5, wherein the loss on ignition of the coal ash is greater than about 8%.

Every reference cited herein is incorporated fully by reference. To the extent that there be any conflict between the teaching of any reference and that of the instant specification, the teaching of the instant specification shall control.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composition, useful for a coating material, comprising: (a) no more than 75%, by weight, coal ash, wherein the loss on ignition of the coal ash is greater than 3%; (b) at least 25%, by weight, latex polymer; and optionally (c) a hydraulic binder, a superplasticizer, a rheology modifier, a filler, an aggregate, a foaming agent, a de-foaming agent, a reinforcing agent, an accelerant and/or a retardant.

2. A composition, useful for a coating material, consisting of: (a) no more than 75%, by weight, coal ash, wherein the loss on ignition of the coal ash is greater than 3%; and (b) at least 25%, by weight, latex polymer.

3. A coating material produced by admixing (a) no more than 75%, by weight, coal ash, wherein the loss on ignition of the coal ash is greater than 3%; (b) at least 25%, by weight, latex polymer; and optionally (c) a hydraulic binder, a superplasticizer, a rheology modifier, a filler, an aggregate, a foaming agent, a de-foaming agent, a reinforcing agent, an accelerant and/or a retardant.

4. A composition according to claim 1, wherein the loss on ignition of the coal ash is greater than about 4%.

5. A composition according to claim 2, wherein the loss on ignition of the coal ash is greater than about 4%.

6. A coating material according to claim 3, wherein the loss on ignition of the coal ash is greater than about 4%.

7. A composition according to claim 1, wherein the loss on ignition of the coal ash is greater than about 5%.

8. A composition according to claim 2, wherein the loss on ignition of the coal ash is greater than about 5%.

9. A coating material according to claim 3, wherein the loss on ignition of the coal ash is greater than about 5%.

10. A composition according to claim 1, wherein the loss on ignition of the coal ash is greater than about 8%.

11. A composition according to claim 2, wherein the loss on ignition of the coal ash is greater than about 8%.

12. A coating material according to claim 3, wherein the loss on ignition of the coal ash is greater than about 8%.

* * * * *